United States Patent
Venkataraman et al.

(10) Patent No.: US 12,190,906 B1
(45) Date of Patent: Jan. 7, 2025

(54) SYSTEMS AND METHODS FOR PREDICTING AN EMOTION BASED ON A MULTIMODAL INPUT

(71) Applicant: Wells Fargo Bank, N.A., San Francisco, CA (US)

(72) Inventors: Vinothkumar Venkataraman, Bangalore (IN); Ramesh Babu Sarvesetty, Bangalore (IN); Rahul Ignatius, Bangalore (IN); Naveen Gururaja Yeri, Bangalore (IN); Saurav Kumar, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 272 days.

(21) Appl. No.: 17/645,031

(22) Filed: Dec. 17, 2021

(51) Int. Cl.
| | |
|---|---|
| G10L 25/63 | (2013.01) |
| G06N 20/00 | (2019.01) |
| G10L 15/26 | (2006.01) |
| G10L 15/32 | (2013.01) |
| H04L 51/02 | (2022.01) |
| H04M 3/493 | (2006.01) |

(52) U.S. Cl.
CPC ............ *G10L 25/63* (2013.01); *G06N 20/00* (2019.01); *G10L 15/26* (2013.01); *G10L 15/32* (2013.01); *H04L 51/02* (2013.01); *H04M 3/4936* (2013.01)

(58) Field of Classification Search
None
See application file for complete search history.

(56) References Cited

U.S. PATENT DOCUMENTS

| | | |
|---|---|---|
| 8,238,541 B1 | 8/2012 | Kalavar |
| 8,688,453 B1 | 4/2014 | Joshi et al. |
| 10,277,743 B1 | 4/2019 | Agarwal |
| 10,706,841 B2 | 7/2020 | Gruber |
| 10,761,866 B2 | 9/2020 | Liu |

(Continued)

FOREIGN PATENT DOCUMENTS

| | | | | |
|---|---|---|---|---|
| CA | 3039759 A1 | * | 3/2018 | ............ G06F 7/02 |
| CN | 107832663 A | * | 3/2018 | ............ G06F 16/35 |

(Continued)

OTHER PUBLICATIONS

Ilyas, Chaudhary Muhammad Aqdus, et al. "Deep Emotion Recognition through Upper Body Movements and Facial Expression." VISIGRAPP (5: VISAPP). 2021. (Year: 2021).

(Continued)

*Primary Examiner* — Quynh H Nguyen
(74) *Attorney, Agent, or Firm* — K&L Gates LLP

(57) ABSTRACT

Systems, apparatuses, methods, and computer program products are disclosed for predicting an emotion in real-time based on a multimodal input including at least (i) an amount of keystrokes over a period of time and (ii) text. An example method may include receiving, by a communications circuitry, a multimodal input from a user including at least (i) an amount of keystrokes over a period of time and (ii) text. The example method may further include generating, by a trained machine learning model of an emotion prediction circuitry and using the multimodal input, an EmotionPrint for the user. The example method may finally include determining, by the emotion prediction circuitry and using the EmotionPrint, a next action.

23 Claims, 10 Drawing Sheets

(56) References Cited

U.S. PATENT DOCUMENTS

| | | |
|---|---|---|
| 11,250,876 B1 | 2/2022 | McCloskey et al. |
| 11,735,207 B1 | 8/2023 | Venkataraman |
| 2004/0082839 A1 | 4/2004 | Haugen |
| 2009/0002178 A1 | 1/2009 | Guday et al. |
| 2014/0163960 A1 | 6/2014 | Dimitriadis et al. |
| 2014/0244249 A1 | 8/2014 | Mohamed et al. |
| 2015/0193718 A1 | 7/2015 | Shaburov et al. |
| 2015/0288818 A1 | 10/2015 | Srivastava et al. |
| 2016/0071126 A1 | 3/2016 | Chang et al. |
| 2017/0116177 A1 | 4/2017 | Walia |
| 2017/0169101 A1 | 6/2017 | Walia et al. |
| 2018/0248746 A1 | 8/2018 | Deluca et al. |
| 2018/0285641 A1 | 10/2018 | Yan et al. |
| 2018/0303397 A1 | 10/2018 | Krupat et al. |
| 2018/0308487 A1 | 10/2018 | Goel et al. |
| 2018/0374000 A1* | 12/2018 | Herzig .................... G06N 3/006 |
| 2020/0104616 A1 | 4/2020 | el Kaliouby et al. |
| 2020/0349582 A1* | 11/2020 | Savir ....................... G06N 20/10 |
| 2020/0356999 A1 | 11/2020 | Pandey et al. |
| 2020/0394269 A1 | 12/2020 | Seibel |
| 2021/0043099 A1 | 2/2021 | Du et al. |
| 2021/0050033 A1 | 2/2021 | Bui et al. |
| 2021/0097267 A1 | 4/2021 | Stokman et al. |
| 2021/0192332 A1 | 6/2021 | Gangotri et al. |
| 2021/0287656 A1 | 9/2021 | Bonafonte et al. |
| 2022/0043938 A1 | 2/2022 | Kochura et al. |
| 2022/0044265 A1 | 2/2022 | Wilbert et al. |
| 2023/0045930 A1 | 2/2023 | Can |
| 2023/0095215 A1 | 3/2023 | Cheaz |
| 2023/0102975 A1* | 3/2023 | Mokashi .............. A61B 5/7475 600/300 |

FOREIGN PATENT DOCUMENTS

| | | | |
|---|---|---|---|
| CN | 107943790 A | * 4/2018 | |
| CN | 111696559 A | * 9/2020 | ............ G10L 17/02 |
| CN | 112397061 A | 2/2021 | |
| EP | 3706402 A1 | 9/2020 | |
| GB | 2591245 A | 7/2021 | |

OTHER PUBLICATIONS

Wei, Gou, Li Jian, and Sun Mo. "Multimodal (audio, facial and gesture) based emotion recognition challenge." 2020 15th IEEE International Conference on Automatic Face and Gesture Recognition (FG 2020). IEEE, 2020. (Year: 2020).

Zen, Gloria, et al., Learning Personalized Models for Facial Expression Analysis and Gesture Recognition, IEEE Transactions on Multimedia (vol. 18, Issue: 4, Apr. 2016).

Mustaqeem, M. Sajjad and S. Kwon, "Clustering-Based Speech Emotion Recognition by Incorporating Learned Features and Deep BiLSTM," in IEEE Access, vol. 8, pp. 79861-79875, 2020, doi: 10.1109/ACCESS.2020.2990405.

Robinson, Kerry, "Natural language IVR—what, why, how?," VoxGen Limited, Sep. 27, 2019.

Nuance website, https://www.nuance.com/omni-channel-customer-engagement/technologies/natural-language-understanding, 2021.

SmartAction website, https://www.smartaction.ai/intelligent-front-door/, 2021.

* cited by examiner

SYSTEMS AND METHODS FOR PREDICTING AN EMOTION BASED ON A MULTIMODAL INPUT

TECHNOLOGICAL FIELD

Example embodiments of the present disclosure relate generally to predicting emotions based on a multimodal input and, more particularly, to systems and methods for generating an EmotionPrint based on a multimodal input including one or more of speech, text, keystrokes, facial expressions and/or gestures.

BACKGROUND

Many institutions, such as banks and other service and product providers, offer in-person and video based services, Interactive Voice Response (IVR) systems, artificial intelligence chat bots, and/or chat based services. Currently, customers or other users who call in to customer service centers or initiate text-based interactions are routed through different IVR or text-based paths or menus based on choices that the customer makes (e.g., selecting an option from a menu of options). The current call or chat routing methodologies are not intelligent, but are rules-based (e.g., based on customer selections from the generic or broad IVR or chat-based menus). Calls are not assigned or re-directed to agents based on customer emotion or anything more than the previously mentioned selections. Further, there is currently no way for an IVR or chat system to understand the emotion displayed by a customer. This lack of personalization decreases customer satisfaction. For example, rules-based systems may cause certain customers to experience longer delays than they would experience in a more personalized interaction, thus exacerbating any potential frustration or anger the customer had already experienced prior to the call.

BRIEF SUMMARY

Emotion prediction is utilized in various fields today. However, IVR and chat-based systems today do not effectively harness the opportunities afforded by various emotion prediction systems. For instance, emotion predictions are not based multiple different inputs or utilized when determining where and how to redirect customer calls to maximize customer satisfaction and/or minimize customer dis-satisfaction.

Accordingly, Applicant has recognized a need for systems, methods, and apparatuses for predicting emotions and/or generating an EmotionPrint based on a multimodal input including at least text and an amount of keystrokes over a period of time. Predicted emotion(s) and/or generated EmotionPrint(s) can be utilized to ensure that a customer interaction (e.g., text or chat-based or audio based) is routed quickly and properly. Utilizing the customer's typed text and/or text converted from speech, based on the multimodal input, example embodiments detect a customer's emotional characteristics in real-time (e.g., an EmotionPrint) for use in providing potential next actions for an artificial intelligence (AI) based bot or agent. To this end, example systems described herein analyze the multimodal input from a customer and agent or bot interaction using several machine learning models or classifiers. Based on this analysis, example embodiments may predict or generate the customer's and/or agent's emotion or EmotionPrint, respectively, which in turn may be utilized in determining a next action for the agent or bot and/or in real-time and/or later determining an agent's, bot's, and/or branch's or store's performance.

Systems, apparatuses, methods, and computer program products are disclosed herein for predicting an emotion and/or generating an EmotionPrint based on a multimodal input from a user. The predicted emotions or the EmotionPrint may be utilized to determine the next best action or personalized action. For instance, a chat or text-based interaction may be transferred to an agent capable of handling customers in the particular customer's current emotional state. Further, the predicted emotions or EmotionPrints may be stored in memory, along with associated metadata, and utilized for determining an agent's performance, a bot's performance, and/or the cumulative performance of a branch or store. For example, agents may interact with a number of customers via audio, video, or text based applications throughout a day. Each interaction may produce data or an EmotionPrint based on the predicted emotion. A user interface may include statistics that can be visualized based on selectable fields from the metadata, such as time, date, day, month, customer information, employee information, entity, agent, and/or branch, among other aspects. Based on such visualizations, corrective action may be taken.

In one example embodiment, a method is provided for predicting an emotion and/or generating an EmotionPrint based on a multimodal input. The method may include receiving, by a communications circuitry, a multimodal input from a user including at least (i) an amount of keystrokes over a period of time and (ii) text. The method may include generating, by a trained machine learning model of an emotion prediction circuitry and using the multimodal input, an EmotionPrint for the user. The method may further include determining, by the emotion prediction circuitry and using the EmotionPrint, a next action.

In an embodiment, the multimodal input may include one or more of speech or a series of images. Generating the EmotionPrint may additionally include causing, by a multimodal feature extraction circuitry and using the multimodal input, generation of one or more multimodal features. The method may include extracting, by the multimodal feature extraction circuitry and using the one or more multimodal features, one or more multimodal vectors. The method may include normalizing, via a Softmax layer of an emotion prediction circuitry, the one or more multimodal vectors to form one or more probabilities corresponding to one or more emotions. The method may include calculating, via the Softmax layer of the emotion prediction circuitry, a probability distribution based on the one or more probabilities corresponding to one or more emotions. The EmotionPrint may be generated based on the probability distribution.

In such embodiments, the method may further include, if the multimodal input includes speech: converting, via automatic speech recognition circuitry, the speech to converted text; causing, by a speech-context Bidirectional Long Short-Term Memory (BLSTM) of the emotion prediction circuitry and using the text of the multimodal input and converted text, generation of context hidden vectors using; and causing, by emotion prediction circuitry, generation of audio hidden vectors using the speech and an audio BLSTM network. The method may further include, prior to formation of the one or more probabilities corresponding to one or more emotions: causing, by the emotion prediction circuitry, generation of word aligned hidden vectors using the audio hidden vectors, the context hidden vectors, and an attention layer; causing, by the emotion prediction circuitry, generation of hidden vectors using the context hidden vectors, the one or more multimodal vectors, and a final BLSTM network; reducing, via a max-pooling layer, dimensionality of the hidden vectors to generate reduced dimensionality hidden vectors; and causing, by the emotion prediction circuitry, generation of an emotion vector using the reduced dimensionality hidden vectors and a fully connected layer. The emotion vector may be used to form the one or more probabilities corresponding to one or more emotions.

In another embodiment, the method may further include, prior to generation of one or more multimodal features, pre-processing, by the multimodal feature extraction circuitry, the multimodal input. Pre-processing the multimodal input may include applying a corresponding pre-processing algorithm to a corresponding type of input included in the multimodal input. The corresponding pre-processing algorithms may include one or more of audio pre-processing algorithms, image pre-processing algorithms, or text pre-processing algorithms.

In an embodiment, the multimodal features may include one or more of a number of keystrokes per minute, number of random keystrokes, misspelled words, grammatical errors, or use of punctuations and capitalization.

In another embodiment, the multimodal input may be defined by a portion of communication from a customer. The process to determine the one or more predicted emotions is performed for each portion of communication from a customer. In another embodiment, the next action may include providing one or more of personalized product recommendations and personalized service recommendations. The next action may include one or more of transitioning chat based communication to a call, transferring a communication to a live agent, providing a resolution to an issue.

In another embodiment, the one or more multimodal features may include one or more of a number of keystrokes per minute, number of random keystrokes, misspelled words, grammatical errors, or use of punctuations and capitalization.

In one example embodiment, an apparatus is provided for predicting an emotion based a multimodal input. The apparatus may include a communications circuitry configured to receive a multimodal input including at least (i) an amount of keystrokes over a period of time and (ii) text. The apparatus may include an emotion prediction circuitry. The emotion prediction circuitry may be configured to: generate, by a trained machine learning model using the multimodal input, an EmotionPrint for the user; and determine a next action based on the EmotionPrint. The next action may include transferring the communication to a call center. Further multimodal inputs may include audio based on speech from the customer to an agent or interactive IVR.

The apparatus may further include a call processing circuitry configured to execute the next action and, in response to the next action being a transfer to call center, transfer the predicted emotion and customer data to a corresponding agent.

In one example embodiment, a computer program product is provided for predicting a customer's emotions. The computer program product may comprise at least one non-transitory computer-readable storage medium storing software instructions that, when executed, cause an apparatus to perform actions. The software instructions, when executed, may receive a multimodal input including at least (i) an amount of keystrokes over a period of time and (ii) text. The software instructions, when executed, may generate, by a trained machine learning model using the multimodal input, an EmotionPrint of the user. The generation of the EmotionPrint may be based on an average amount of keystrokes per minute. latency of keystrokes, key hold time, average speed of keystrokes, amount of deletes, amount of special characters used, or variability. The generation of the EmotionPrint may further based on text features, and wherein the text features include one or more of a term frequency-inverse document frequency, embedding, profanity, or praise. The software instructions, when executed, may determine a next action based on the EmotionPrint.

The foregoing brief summary is provided merely for purposes of summarizing example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

DETAILED DESCRIPTION

Figure 1:
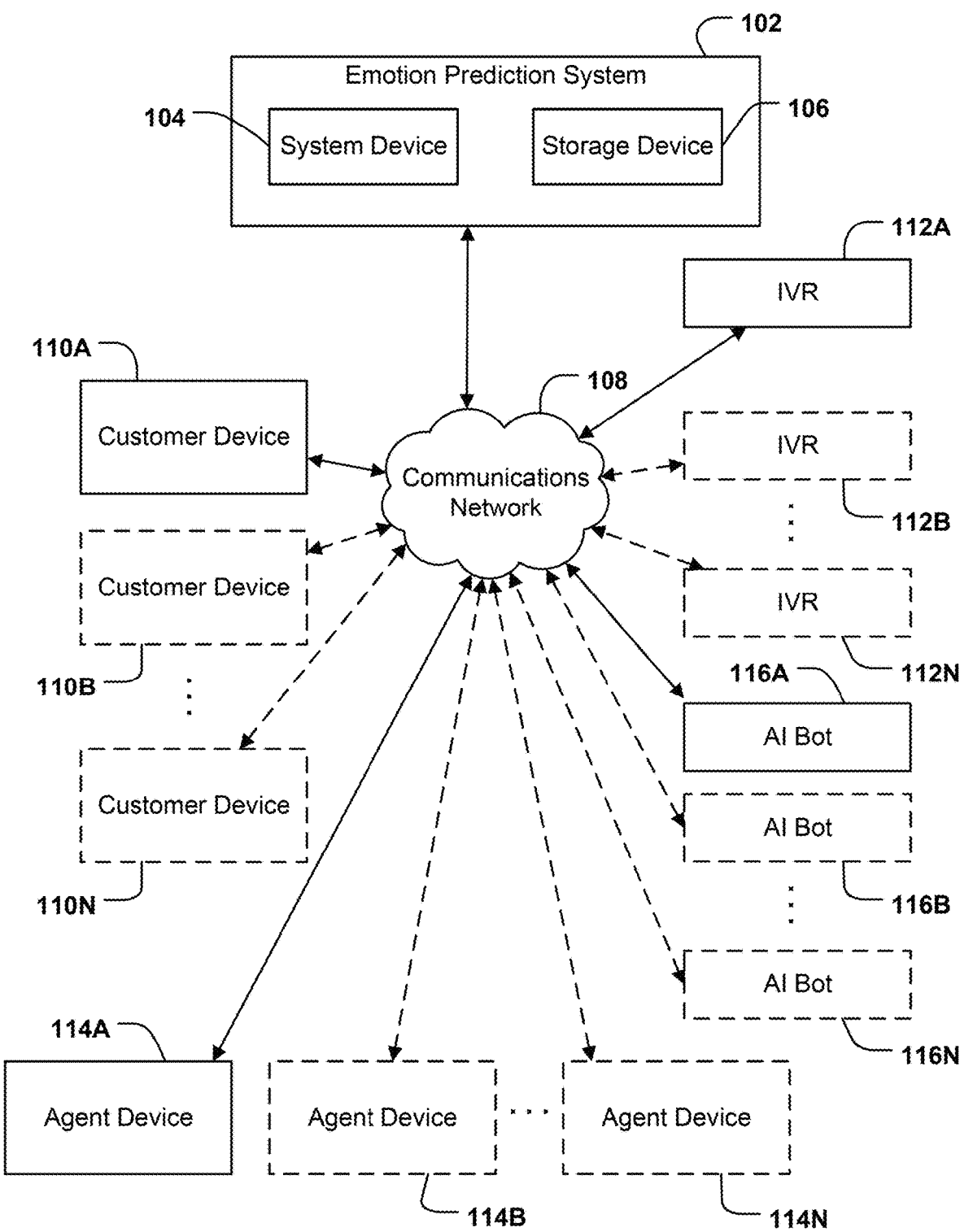
FIG. 1 illustrates a system in which some example embodiments may be used.

Some embodiments of the present disclosure will now be described more fully hereinafter with reference to the accompanying figures, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The terms "chat bot", "artificial intelligence chat bot", "AI chat bot", or "AI bot" are used to refer to software, an application, or algorithm that simulates conversation through natural language messaging applications or chat or text-based systems or applications. For example, a customer may enter a message in a text entry box of such an application and the AI including the application may formulate a response (e.g., asking for additional information or providing a solution or suggestion to the entered message).

Overview

As noted above, methods, apparatuses, systems, and computer program products are described herein that provide for predicting an emotion based on a multimodal input. Such a prediction may occur in real time or subsequent to a received input. Based on the emotion prediction, methods, apparatuses, systems, and computer program products provide for a next action or personalized action for a customer interaction and/or performance management of an IVR, AI chat bot, agent, and/or branch or store. Traditionally, customer service interactions utilize an IVR system or AI chat bot. It can take a long time until a customer's issue is resolved or until the customer's call or text-based interaction is directed to the proper person or resolved. As a call or chat takes longer, customers may grow frustrated and/or angry, but calls or chats will continue on the same path. While a customer's emotion could be given as feedback after the fact, there is no way for a customer's emotion or current emotional state to determine the best route for the call or chat. There is no way to customize a customer's route through an IVR system or chat-based system. In addition, there is typically no way to determine the which employees may be most suited to handle a particular emotion (e.g., no personalized solution). Further, employees cannot be objectively evaluated or prioritized based on how they handle particular predicted emotions and/or based on predicted emotions determined in real-time or for each interaction.

In contrast to conventional techniques for determining emotion based only on audio or text, the present disclosure describes determining emotion, an EmotionPrint, and/or one or more probabilities indicating one or more emotions based on keystrokes or amount of keystrokes, text, speech, text derived from the speech, or some combination thereof. The EmotionPrint may include one or more predicted emotions for a customer interaction for a customer or agent or one or more predicted emotions for a portion or a plurality portions of customer interactions. Further, the EmotionPrint may be an aggregate of the one or more predicted emotions or, at least, the final or most recent predicted emotion. Further, the determined EmotionPrint or probabilities utilized to determine a best call route or re-direction and also to optimize which employees or call center agents receive calls based on predicted emotion. Further, the determined EmotionPrint or probabilities may be utilized to determine a next action and also to optimize which employees or agents may interact with which customers (e.g., specific customers and/or types of customers) based on the EmotionPrint. The determined or generated EmotionPrint or probabilities may also be utilized to determine an employee's or agent's performance in real-time and/or for each customer interaction. When a customer interacts with an employee, agent, IVR, or AI chat bot, via a chat or text-based system, audio communication, and/or video communication, a multimodal input from the customer and/or employee or agent may be captured. The multimodal input may be transmitted for pre-processing. The pre-processing steps or operations may perform specific pre-processing based on the type of input included in the multimodal input. The pre-processed multimodal input may then be transmitted to a trained machine learning model to generate an EmotionPrint.

In another embodiment, the multimodal input may be transmitted to a multimodal feature extraction circuitry. The multimodal feature extraction circuitry may cause generation of one or more multimodal features. The one or more multimodal features may include, at least, text and an amount of keystrokes. The multimodal feature extraction circuitry may extract one or more multimodal vectors from the one or more multimodal features. The one or more multimodal vectors may be transferred to an emotion prediction circuitry. The emotion prediction circuitry may include a Softmax layer. The Softmax layer may form one or more probabilities corresponding to one or more emotions from the one or more multimodal vectors. The Softmax layer may calculate a probability distribution based on the one or more probabilities corresponding to one or more emotions. Based on the probability distribution, the emotion prediction circuitry may predict an emotion and/or generate an EmotionPrint.

Accordingly, the present disclosure sets forth systems, methods, and apparatuses that accurately predict a customer's emotion based on various inputs from the customer (e.g., keystrokes, text, speech, and/or facial gestures), unlocking additional functionality that has historically not been available. For instance, reduced chat or call time waiting. As a customer initiates a chat session with an AI chat bot, rather than waiting to get through multiple menus or responses, if a customer is exhibiting a particular emotion, the system or apparatus may ensure the chat is transferred to a live agent or transitioned to a call. Such an action and/or other actions describe herein may increase customer satisfaction. In particular, as customer chat and/or call wait times are reduced, customer satisfaction will increase. Further, for customers experiencing frustration, anger, or other similar negative emotions, prompt redirection and resolution ensure that customer satisfaction may increase. Finally, customers may be transferred or redirected to proper call center agents and, further, the call center agents may be evaluated and classified based on the call center agent's emotion or handling of a customer experiencing a particular emotion. For instance, as a customer's emotion (e.g., anger) is predicted (e.g., a generated emotion EmotionPrint), a chat or call may be re-directed to an agent with experience handling customer's experiencing such emotions (e.g., anger).

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which embodiments of the present disclosure may operate. As illustrated, an emotion prediction system 102 may include a system device 104 in communication with a storage device 106. Although system device 104 and storage device 106 are described in singular form, some embodiments may utilize more than one system device 104 and/or more than one storage device 106. Additionally, some embodiments of the emotion prediction system 102 may not require a storage device 106 at all. Whatever the implementation, the emotion prediction system 102, and its constituent system device(s) 104 and/or storage device (s) 106 may receive and/or transmit information via communications network 108 (e.g., the Internet) with any number of other devices, such as one or more of customer device 110A, customer device 110B, through customer device 110N, IVR 112A, IVR 112B, through IVR 112N, agent device 114A, agent device 114B, through agent device 114N and/or AI bot 116A, AI bot 116B, through AI bot 116N.

System device 104 may be implemented as one or more servers, which may or may not be physically proximate to other components of emotion prediction system 102. Furthermore, some components of system device 104 may be physically proximate to the other components of emotion prediction system 102 while other components are not. System device 104 may receive, process, generate, and transmit data, signals, and electronic information to facilitate the operations of the emotion prediction system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the emotion prediction system 102. Storage device 106 may store information relied upon during operation of the emotion prediction system 102, such as various keystroke statistics and/or keystroke amounts, text files, audio recordings, and/or speech-to-text files that may be used by the emotion prediction system 102, data and documents to be analyzed using the emotion prediction system 102, or the like. In addition, storage device 106 may store control signals, device characteristics, and access credentials enabling interaction between the emotion prediction system 102 and one or more of the customer devices 110A-110N, IVRs 112A-112N, agent devices 114A-114N, or AI bots 116A-116N.

The one or more IVRs 112A-112N and/or AI bots 116A-116N may be embodied by any storage devices known in the art. Similarly, the one or more customer devices 110A-110N and/or agent devices 114A-114N may be embodied by any computing devices known in the art, such as desktop or laptop computers, tablet devices, smartphones, or the like. The one or more customer devices 110A-110N, the one or more IVRs 112A-112N, the one or more agent devices 114A-114N, and the one or more AI bots 116A-116N need not themselves be independent devices, but may be peripheral devices communicatively coupled to other computing devices.

Although FIG. 1 illustrates an environment and implementation of the present disclosure in which the emotion prediction system 102 interacts with one or more of customer devices 110A-110N, IVRs 112A-112N, agent devices 114A-114N, and/or AI bots 116A-116N in some embodiments one or more of the users or agents may directly interact with the emotion prediction system 102 (e.g., via input/output circuitry of system device 104), in which case a separate device may not need to be utilized for such users or agents. Whether by way of direct interaction or interaction via a separate device, users and agents may communicate with, operate, control, modify, or otherwise interact with the emotion prediction system 102 to perform functions described herein and/or achieve benefits as set forth in connection with this disclosure.

Example Implementing Apparatuses

Figure 2:
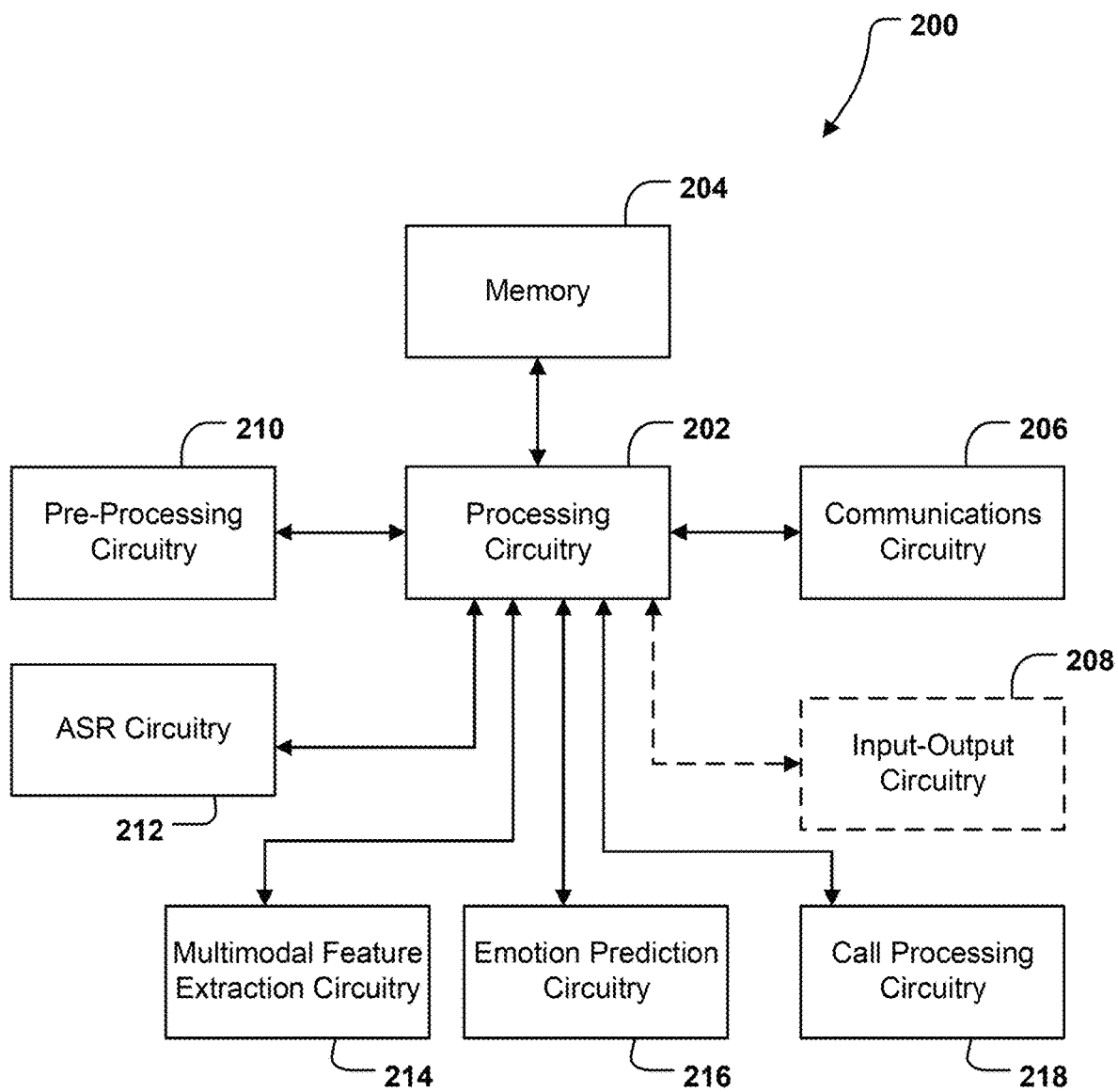
FIG. 2 illustrates a schematic block diagram of example circuitry embodying a device that may perform various operations in accordance with some example embodiments described herein.

System device 104 of the emotion prediction system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, pre-processing circuitry 210, automatic speech recognition (ASR) circuitry 212, multimodal feature extraction circuitry 214, emotion prediction circuitry 216, and call processing circuitry 218, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described herein, such as those described above in connection with FIG. 1 and below in connection with FIGS. 4A-7C.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor 202 may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input (e.g., keystrokes, keystroke statistics, speech, text, series of images or video, and/or other input) may be received via a separate device such as a customer devices 110A-110N, IVRs 112A-112N, agent devices 114A-114N, and/or AI bots 116A-116N. The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, an image capture device, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises pre-processing circuitry 210 that pre-processes the multimodal input from a customer or other user. The pre-processing circuitry 210 may utilize processor 202, memory 204, or any other hardware component included in the apparatus 200 to perform these operations, as described in connection with FIGS. 4A-7C below. The pre-processing circuitry 210 may further utilize communications circuitry 206 to gather data from a variety of sources (e.g., customer devices 110A-110N, agent devices 114A-114N, or storage device 106, as shown in FIG. 1), may utilize input-output circuitry 208 to receive data from a user, and in some embodiments may utilize processor 202 and/or memory 204 to process the multimodal input from a customer, agent, or other user. The output of the pre-processing circuitry 210 may be transmitted to other circuitry of the apparatus 200 (e.g., ASR circuitry 212 and/or multimodal feature extraction circuitry 214). In an embodiment, the pre-processing circuitry 210, prior to pre-processing, may capture a reply, text, or speech, or a portion of a reply, text, or speech from a customer and/or agent. In another embodiment, the reply, text, or speech or a portion of a reply, text, or speech from a customer and/or agent may be captured by other circuitry and provided or transmitted to the pre-processing circuitry 210. Further, other circuitry, such as the multimodal feature extraction circuitry 214 may pre-process the reply, text, or speech or a portion of a reply, text, or speech from a customer and/or agent.

In addition, the apparatus 200 further comprises an ASR circuitry 212 that converts audio to text and may create a context related hidden vector via a context BLSTM network (e.g., an ELMo) included, for example as instructions, in the ASR circuitry 212. The ASR circuitry 212 may utilize processor 202, memory 204, or any other hardware component included in the apparatus 200 to perform these operations, as described in connection with FIGS. 4A through 7C below. The ASR circuitry 212 may further utilize communications circuitry 206 to gather data from a variety of sources (e.g., customer devices 110A-110N, agent devices 114A-114N, or storage device 106, as shown in FIG. 1), may utilize input-output circuitry 208 to receive data from a user, and in some embodiments may utilize processor 202 and/or memory 204 to convert audio to text, to create a context related hidden vector, and/or create a hidden vector from the context related hidden vector including likelihoods of particular emotions. The output of the ASR circuitry 212 may be transmitted to other circuitry of the apparatus 200 (e.g., emotion prediction circuitry 216).

In addition, the apparatus 200 may also comprise a multimodal feature extraction circuitry 214 that extracts various features from customer, agent, or other user keystrokes, text, audio, or other input and may create a hidden vector via an included BLSTM network. As used herein, a BLSTM network may refer to a type of neural network, recurrent neural network, or other trained machine learning algorithm, as will be understood by a person skilled in the art. The multimodal feature extraction circuitry 214 may utilize processor 202, memory 204, or any other hardware component included in the apparatus 200 to perform these operations, as described in connection with FIGS. 4A through 7C below. The multimodal feature extraction circuitry 214 may further utilize communications circuitry 206 to gather data from a variety of sources (e.g., customer devices 110A-110N, agent devices 114A-114N, or storage device 106, as shown in FIG. 1), may utilize input-output circuitry 208 to receive data from a user, and in some embodiments may utilize processor 202 and/or memory 204 to create hidden vector(s) including likelihoods of particular emotions. The output of the multimodal feature extraction circuitry 214 may be transmitted to other circuitry of the apparatus 200 (e.g., emotion prediction circuitry 216).

In addition, the apparatus 200 may also comprise an emotion prediction circuitry 216 that, utilizing the output from the ASR circuitry 212 and/or the multimodal feature extraction circuitry 214, outputs a prediction of a customer's, agent's, or other user's emotion or EmotionPrint. Additionally, rather than creating such vectors in the ASR circuitry 212 and the multimodal feature extraction circuitry 214, the emotion prediction circuitry 216 may utilize outputs from the ASR circuitry 212 and the multimodal feature extraction circuitry 214 to create various vectors. The emotion prediction circuitry 216 may create text hidden vectors using the context hidden vectors and a text BLSTM network; create a context related hidden vector via a context BLSTM network; create an multimodal hidden vector via an included multimodal BLSTM network; create a word aligned hidden vectors using the multimodal hidden vectors, the text hidden vectors, and an attention layer; and/or create hidden vectors using the word aligned hidden vectors, the text hidden vectors, and a final BLSTM network. Further, the emotion prediction circuitry 216 may reduce dimensionality of the hidden vector via a max-pooling layer, generate an emotion vector of a size determined by a number of emotions considered using the reduced dimensionality hidden vector via a fully connected layer, normalize the emotion vector to thereby form one or more probabilities corresponding to one or more emotions, and/or calculate a probability distribution based on the one or more probabilities corresponding to one or more emotions. The emotion prediction circuitry 216 may utilize processor 202, memory 204, or any other hardware component included in the apparatus 200 to perform these operations, as described in connection with FIGS. 4A through 7C below. The emotion prediction circuitry 216 may further utilize communications circuitry 206 to gather data from a variety of sources (e.g., customer devices 110A-110N, agent devices 114A-114N, or storage device 106, as shown in FIG. 1), may utilize input-output circuitry 208 to receive data from a user, and in some embodiments may utilize processor 202 and/or memory 204 to create a number (e.g., numeric value) or probability indicative of a customer's, agent's, or other user's emotion. The probability indicative of emotion may be utilized to generate an EmotionPrint. The output of the emotion prediction circuitry 216 may be transmitted to other circuitry of the apparatus 200. The emotion prediction circuitry 216 may further determine a next best action for a call or text-based interaction based on the number or probability indicative of the customer's, agent's or other user's emotion or the EmotionPrint. The output of emotion prediction circuitry 216 may be transmitted to other circuitry of the apparatus 200 (e.g. call processing circuitry 218).

The emotion prediction circuitry 216 may additionally generate a user interface or data related to a user interface. The user interface may include selectable options (e.g., categories) to allow a user to view different data sets related to emotions predicted or EmotionPrints for a particular set of metadata. For example, a user may view the emotions predicted for a series of particular days at a particular time and for a particular agent. In such examples, the emotions predicted or EmotionPrint may include the aggregate of emotions predicted for that particular selection (e.g., the aggregate for those particular days at those times and for that particular agent).

Finally, the apparatus 200 may also comprise a call processing circuitry 218 that, utilizing the output from the emotion prediction circuitry 216, executes the next action. The call processing circuitry 218 may utilize processor 202, memory 204, or any other hardware component included in the apparatus 200 to perform these operations, as described in connection with FIGS. 7A through 7C below. The call processing circuitry 218 may further utilize communications circuitry 206 and/or input-output circuitry 208 to perform or execute the next action. For example, the next action may be to transfer a call from an IVR (e.g., IVRs 112A-112N) or a text-based interaction from an AI bot (e.g., AI bots 116A-116N) to an agent (e.g., to an agent device 114A-114N). In such examples, the call processing circuitry 218 may facilitate or otherwise cause a call or text-based interaction to be re-directed from the IVR or AI bot to the agent. The call processing circuitry 218 may perform other functions, such as re-directing calls from one particular IVR menu to another, re-directing text-based interactions from one particular AI bot to another, selecting a particular agent based on an emotion exhibited by a customer or an EmotionPrint, storing a customer's personalized product or service recommendation, re-directing a call based on the customer's personalized product or service recommendation, determining an agent's rating or ranking, and/or generating a call back for a customer. The call processing circuitry 218 may determine a customer's personalized product or service recommendations based on the text input by the customer or of the customer's speech and/or the context of the text or speech. For example, a customer may call or enter into a text-based interaction with a service center to discuss an overdraft fee or other fee. During replies to an IVR, AI bot, or agent, the customer may mention different products or services. Based on the text and context associated with such a mention, the call processing circuitry 218 may, after initial issue resolution, recommend a product or service, prompt an agent to recommend a product or service, re-direct the call to an IVR or agent corresponding to the recommended product or service, re-direct the text-based interaction to a call, re-direct the text-based interaction from an AI bot to an agent, and/or prompt the AI bot to provide further information regarding the recommended product or service.

In another embodiment, the call processing circuitry 218 may perform other functions. The call processing circuitry 218 may determine product recommendations and/or service recommendations based on text captured during a customer's interaction whether with an IVR, AI bot, or agent. For example, if a customer mentions a credit card or a particular loan, the call processing circuitry 218 may determine that a product or service recommendation includes credit counseling, a new credit card, or a new type of loan, among other products or services. Such product or service recommendations may be given to the customer at varying points during a call or text-based interaction (such as, after issue resolution) via an IVR, an AI bot, an agent, as a call-back, and/or via a form of electronic communication (text message, e-mail, etc.), among other suitable communication methods as will be understood by a person skilled in the art. As noted, the call processing circuitry 218 may re-direct calls or text-based interactions to different live agents, AI bots, or IVR menus. For example, if a customer mentions a credit card issue, but is currently interacting with a different IVR or AI bot (e.g., mortgages), the customer may be re-directed to a credit card IVR or AI bot. The call processing circuitry 218 may further direct calls or text-based interactions based on other factors, such as live agent qualities, characteristics, and/or other objective data (e.g., business unit or group). For example, if the customer exhibits a particular emotion, such as anger, rather than re-directing the call to another IVR or a text-based interaction to another AI bot, the call or text based interaction may be re-directed to an agent, either as a call or a text-based interaction. Further still, the agent may be chosen based on the agent's history handling particular emotions, the live agent's product or service group, and/or based on other agent characteristics or qualities.

Although components 202-218 are described in part using functional language, it will be understood that the particular implementations necessarily include the use of particular hardware. It should also be understood that certain of these components 202-218 may include similar or common hardware. For example, the pre-processing circuitry 210, ASR circuitry 212, multimodal feature extraction circuitry 214, emotion prediction circuitry 216, and call processing circuitry 218 may each at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the pre-processing circuitry 210, automatic speech recognition (ASR) circuitry 212, multimodal feature extraction circuitry 214, emotion prediction circuitry 216, and call processing circuitry 218 may leverage processor 202, memory 204, communications circuitry 206, or input-output circuitry 208 as described above, it will be understood that any of these elements of apparatus 200 may include one or more dedicated processors, specially configured field programmable gate arrays (FPGA), or application specific interface circuits (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the pre-processing circuitry 210, automatic speech recognition (ASR) circuitry 212, multimodal feature extraction circuitry 214, emotion prediction circuitry 216, and call processing circuitry 218 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments of the present disclosure are described below in connection with a series of graphical user interfaces and flowcharts.

GUI

Figure 3:
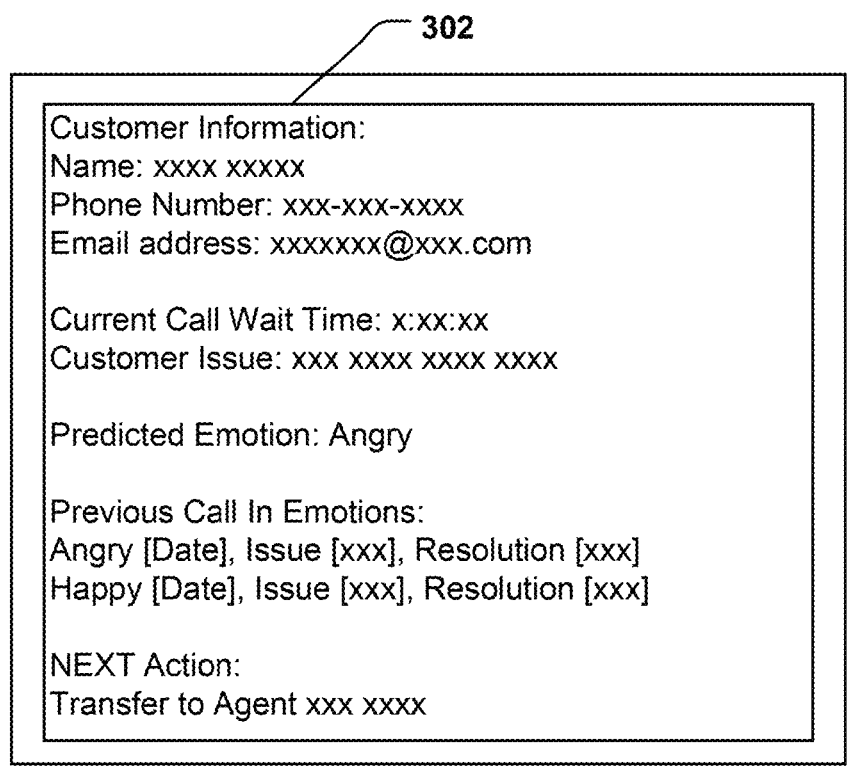
FIG. 3 illustrates an example graphical user interface (GUI) used in some example embodiments described herein.

Turning to FIG. 3, a graphical user interface (GUI) 302 is provided that illustrates what an agent sees after a prediction is made. As noted previously, the agent may interact with the emotion prediction system 102 by directly engaging with input-output circuitry 208 of an apparatus 200 comprising a system device 104 of the emotion prediction system 102. In such an embodiment, the GUI shown in FIG. 3 may be displayed to the agent by the apparatus 200. Alternatively, the agent may interact with the emotion prediction system 102 using a separate agent device (e.g., any of agent devices 114A-114N, as shown in FIG. 1), which may communicate with the emotion prediction system 102 via communications network 108. In such an embodiment, the GUI 302 shown in FIG. 3 may be displayed to the agent by the agent device.

As described herein, a customer may call or initiate a text-based interaction with a customer service center from a customer device (e.g., any of customer devices 110A-110N, as shown in FIG. 1). The customer may respond to prompts transmitted by an IVR (e.g., any of IVRs 112A-112N) or AI bot (e.g., any of the AI bots 116A-116N). This information may be received by the emotion prediction system 102, which may in turn identify the customer's emotion and/or generate an EmotionPrint and may, based on that identified customer emotion and/or generated EmotionPrint, cause the call to be transferred from the IVR (e.g., any of IVRs 112A-112N) or the text-based interaction to be transferred from the AI bot (e.g., any of the AI bots 116A-116N) to an agent device (e.g., one of agent devices 114A-114N) either as a call or text-based interaction. In addition to causing transfer of the call or text-based interaction to the agent device, various data points may be transmitted to the agent device. The GUI 302 may thereafter present such information for review by the agent using the agent device. The information may include a customer's personal information, the reason (if known) that a customer initiated an interaction, a customer call or interaction history, the customer's predicted emotion, and/or the EmotionPrint. In such examples, the agent receiving the call or text-based interaction may receive the call or text-based interaction based on the agent's experience handling customers experiencing the predicted emotion. Knowledge of the customer's predicted emotion may allow for the agent to act appropriately to address the customer more successfully than may otherwise be expected. The forwarding of the call may be based on various other information, such as the caller's emotion history, the caller's current emotion, the customer's EmotionPrint, and/or other information.

As noted, each interaction between a customer and an agent, IVR, or AI bot may produce data or an EmotionPrint based on the predicted emotion(s). The GUI may include statistics that can be visualized based on selectable fields from the metadata, such as time, date, day, month, customer information, employee information, entity, agent, and/or branch, among other aspects. Based on such visualizations, corrective action may be taken Example Operations Turning first to FIG. 4. a schematic block diagram 400 is shown that represents an example emotion prediction flow, as, for example, implemented in emotion prediction system 102 and/or apparatus 200. To perform the operations described below, the apparatus 200 may utilize one or more of processor 202, memory 204, communications circuitry 206, input-output circuitry 208, pre-processing circuitry 210, ASR circuitry 212, multimodal feature extraction circuitry 214, emotion prediction circuitry 216, call processing circuitry 218, and/or any combination thereof. It will be understood that user interaction with the emotion prediction system 102 may occur directly via input-output circuitry 208, or may instead be facilitated by a separate IVR 112A-112N or AI bot 116A-116N, as shown in FIG. 1, and which may have similar or equivalent physical componentry facilitating such user interaction.

Figure 4:
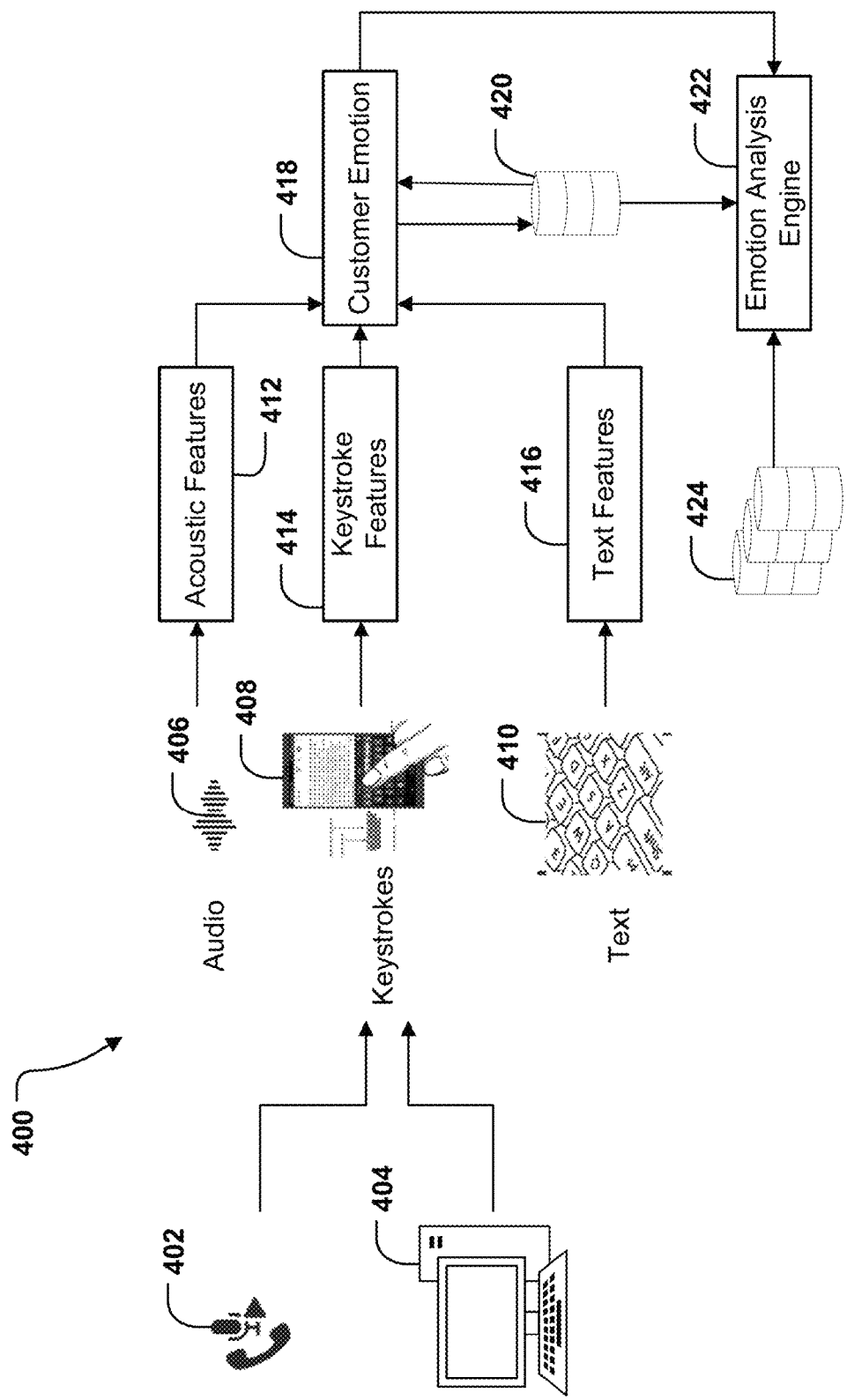
FIG. 4 illustrates an example schematic block diagram used in some example embodiments described herein.

As illustrated in FIG. 4, a customer may initiate an interaction with an agent, IVR, or AI chat bot. The agent, IVR, or AI chat bot and/or customer may interact via a phone 402 (or other means capable of facilitating audio interactions) and/or via a computing device 404. Such an interaction may produce a number of different inputs, e.g., a multimodal input. The multimodal input may include audio 406, keystrokes 408 or keystroke statistics, text 410, and/or video or images. Based on the type of input gathered from such interactions, various features and/or vectors may be generated. For example, acoustic features 412 (e.g., including Mel Frequency Cepstral Coefficients, Zero Crossing Rate, and/or Spectral Features) may be generated from audio 406 gathered between a customer and agent, keystroke features 414 (e.g., latency, key hold time, average speed of key strokes, mean inter-tap duration, use of backspace, use of delete, use of special characters, and/or variability) may be generated from keystroke statistics, text features 416 (e.g., TFIDF, embedding, profanity, and/or praise) from text 410, and/or video or image features (facial expressions, hand gestures, and/or limb gesture) from video or image.

Based on the extracted features and using a trained machine learning model, a customer emotion may be predicted (e.g., via an emotion prediction circuitry 216). The predicted emotion may be considered or utilized to generate an EmotionPrint. The EmotionPrint may be transmitted or stored, along with the extracted features, in a database 420. The EmotionPrint may be transmitted to an emotion analysis engine 422 (e.g., implemented in, for example, call processing circuitry 218). The emotion analysis engine 422 may generate a next action. The emotion analysis engine 422 may receive additional data (e.g., agent data, customer data, and/or transaction data) to be utilized in generating a next action from another database 424. The next action may be transmitted back to the database 420.

Figure 6A:
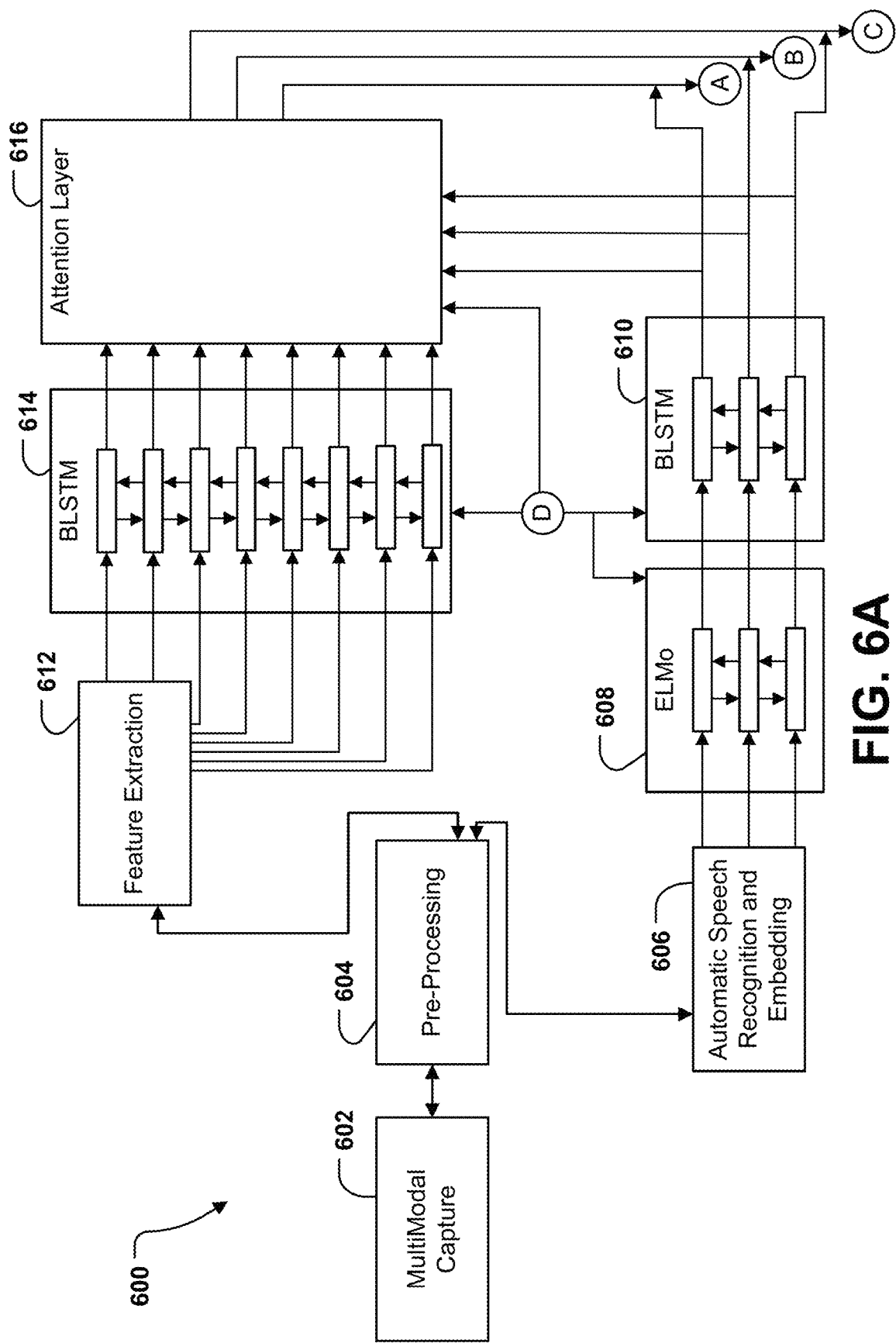
FIG. 6A and FIG. 6B illustrates another example schematic block diagram used in some example embodiments described herein.
Figure 6B:
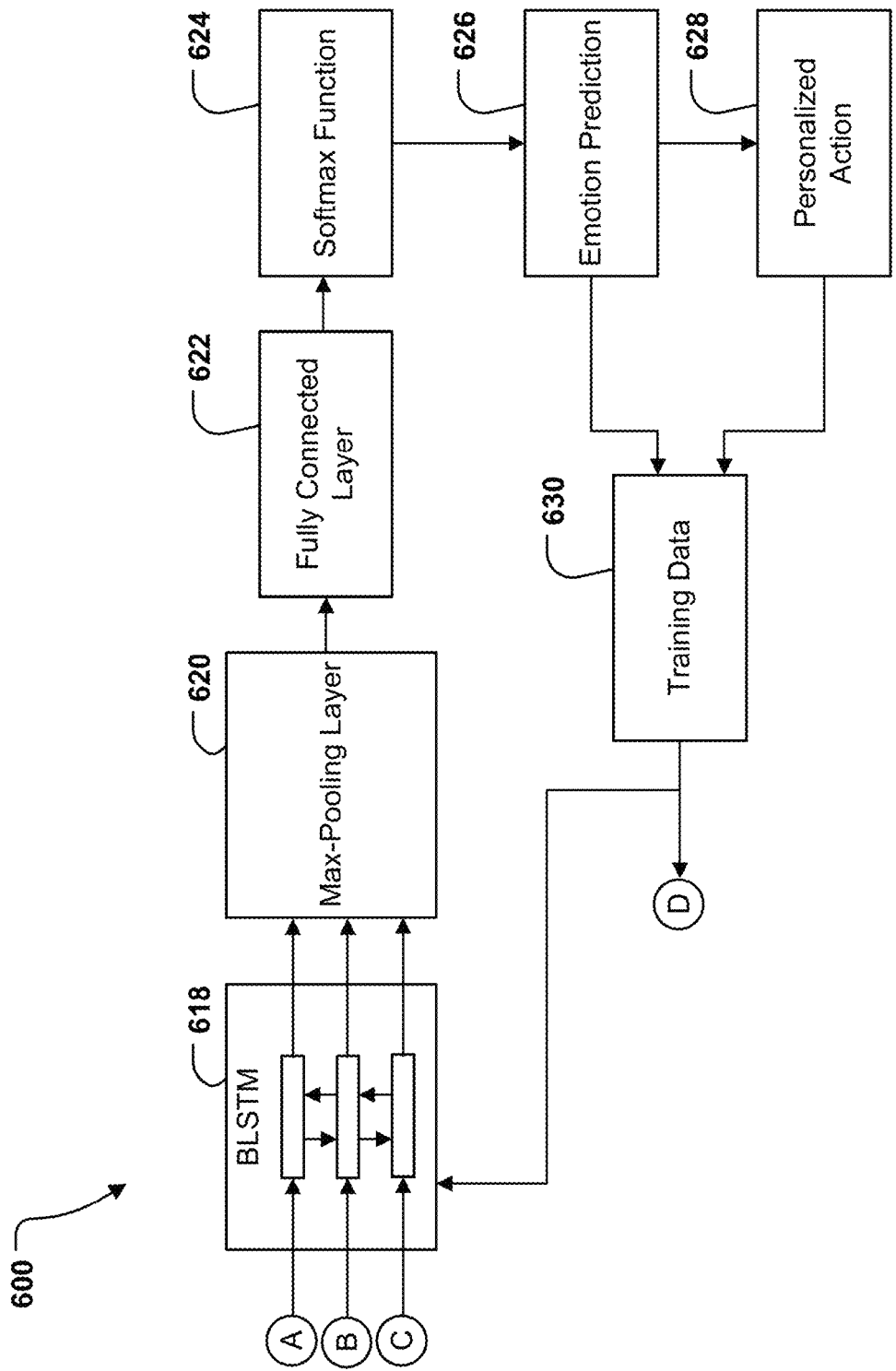

The trained machine learning model may include one or more BLSTM networks (e.g., as illustrated in FIGS. 6A and 6B) or another trained machine learning model. Other trained machine learning models may include decision trees, random forest models, random forests utilizing bagging or boosting (as in, gradient boosting), neural network methods, support vector machines (SVM), Generative Adversarial Networks (GANs), and/or some combination thereof, including any model suitable for predicting a variable as will be understood by a person skilled in the art.

Figure 5:
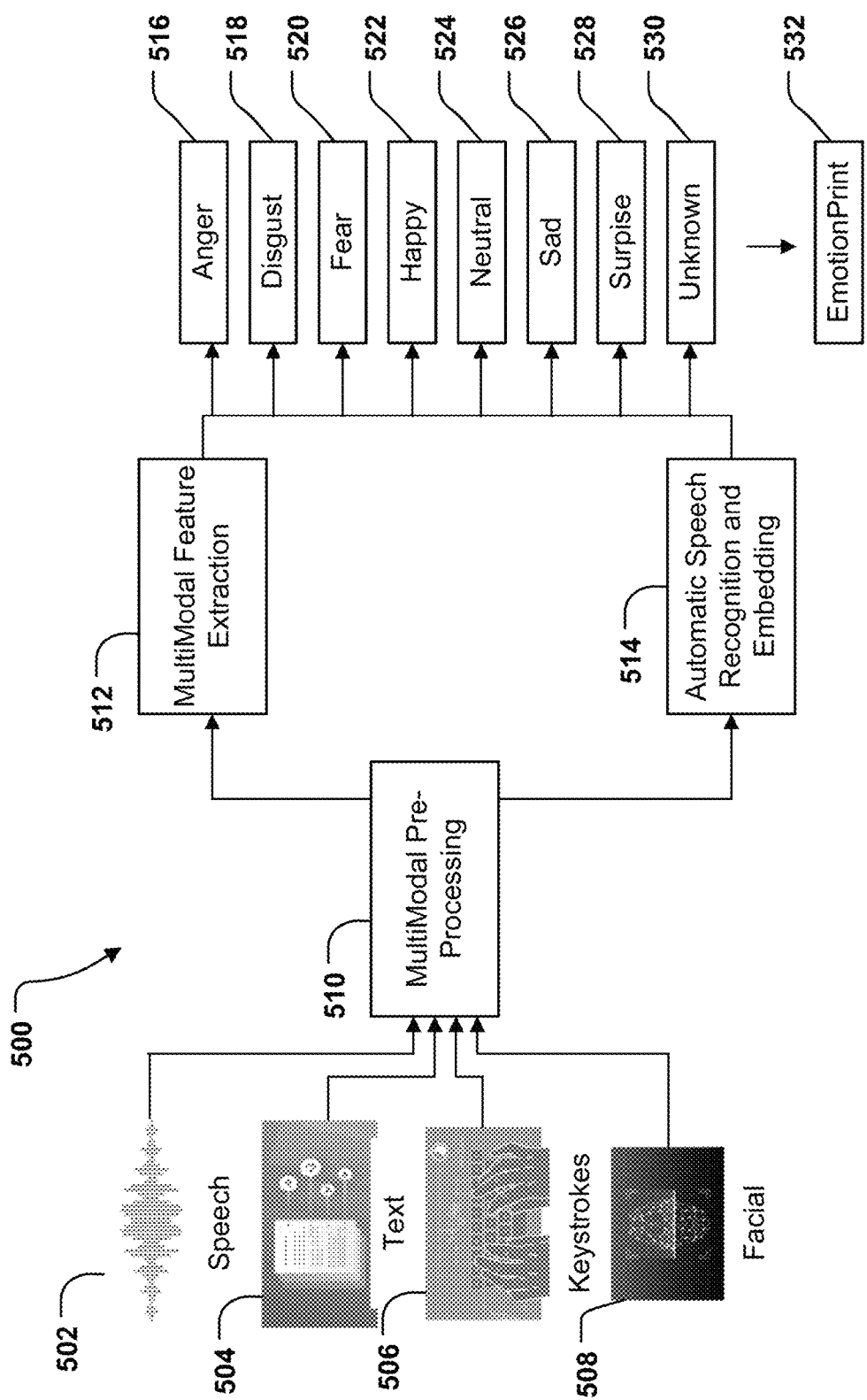
FIG. 5 illustrates another example schematic block diagram used in some example embodiments described herein.

Turning next to FIG. 5, a schematic block diagram 500 is shown that represents an example emotion prediction flow, as, for example, implemented in emotion prediction system 102 and/or apparatus 200. To perform the operations described below, the apparatus 200 may utilize one or more of processor 202, memory 204, communications circuitry 206, input-output circuitry 208, pre-processing circuitry 210, ASR circuitry 212, multimodal feature extraction circuitry 214, emotion prediction circuitry 216, call processing circuitry 218, and/or any combination thereof. It will be understood that user interaction with the emotion prediction system 102 may occur directly via input-output circuitry 208, or may instead be facilitated by a separate IVR 112A-112N or AI bot 116A-116N, as shown in FIG. 1, and which may have similar or equivalent physical componentry facilitating such user interaction.

As illustrated in FIG. 5, a customer may initiate an interaction with an agent, IVR, or AI chat bot via a phone (or other means capable of facilitating audio interactions) and/or via a computing device. Such an interaction may produce a number of different inputs, e.g., a multimodal input. The multimodal input may include audio or speech 502, text 504, keystrokes 506 or keystroke statistics, and/or video or images (e.g., facial recognition 508). Once each input has been received, for example by an emotion prediction system, the input may be processed by multimodal pre-processing 510. Such pre-processing may, depending on the type of input, include performing noise reduction in images or audio, correcting misspelled words (while preserving the misspellings for emotion prediction purposes), correcting grammatical errors (while preserving the grammatical errors for emotion prediction purposes), determining an endpoint of speech, and/or reducing background sounds in audio.

Once the multimodal input has been pre-processed, based on the type of input gathered from such interactions, various features and/or vectors may be generated at multimodal feature extraction 512. For example, acoustic features may be generated from audio gathered between a customer and agent, keystroke features may be generated from keystroke statistics, text features from text, and/or video or image features from video or image.

If the multimodal input includes audio, the audio may be transmitted to ASR and embedding 514. The ASR and embedding 514 may convert the audio to text and, using a trained machine learning model, generate context vectors from the audio and resulting text.

Using a trained machine learning model, the multimodal features, text converted from audio, and/or the context of the audio, may be utilized to determine an emotion, such as anger 516, disgust 518, fear 520, happiness 522, a neutral expression 524, sadness 526, surprise 528, and/or other emotions that a user (e.g., customer and/or agent) may experience. In an example, based on the multimodal input, no emotion may be predicted. In such an example, the output may be "unknown" 530 or some other indicator to indicate that no emotion has been predicted. The predicted emotion may be considered an EmotionPrint 532. As an interaction progresses, a plurality of emotions may be predicted. The EmotionPrint 532 may change over the course of the interaction in conjunction with each predicted emotion. For Example, the EmotionPrint 532 may be updated to reflect the most recent predicted emotion. In another example, the EmotionPrint 532 may be an aggregate for all predicted emotions over the course of the interaction. In such an example, the EmotionPrint 532 may include the predicted emotion along with a time stamp of when the emotion was predicted and/or other data (e.g., the data utilized to predict the emotion and/or the extracted features).

Based on such an EmotionPrint 532, a next action for the interaction may be determined, for example, by the emotion prediction system 102. Thus, the interaction may be handled in a manner based on real-time predicted emotions allowing for prompt resolution of a customer's, reduced wait times, and/or determination of the next best action for such interactions. Further, the EmotionPrint 532 may be generated for a customer and/or an agent. The EmotionPrint 532 for one or more Turning next to FIGS. 6A and 6B, a schematic block diagram 600 is shown that represents an example emotion prediction flow, as, for example, implemented in emotion prediction system 102 and/or apparatus 200. To perform the operations described below, the apparatus 200 may utilize one or more of processor 202, memory 204, communications circuitry 206, input-output circuitry 208, pre-processing circuitry 210, ASR circuitry 212, multimodal feature extraction circuitry 214, emotion prediction circuitry 216, call processing circuitry 218, and/or any combination thereof. It will be understood that user interaction with the emotion prediction system 102 may occur directly via input-output circuitry 208, or may instead be facilitated by a separate IVR 112A-112N or AI bot 116A-116N, as shown in FIG. 1, and which may have similar or equivalent physical componentry facilitating such user interaction.

As illustrated in FIG. 6A, such an example may begin with multimodal capture 402. Circuitry of apparatus 200 (e.g., such as pre-processing circuitry 210) may capture or record a multimodal input including one or more of keystrokes, amount of keystrokes, text, speech, images, a series of images, video, or a reply from a customer, agent, and/or other user at 602. The captured multimodal input may be transmitted for pre-processing 604 (e.g., such an operation performed or executed by pre-processing circuitry 210). The pre-processing 604 may reduce noise either in images or speech, determine an end point of speech, correct misspelled words in text while preserving the original text for emotion prediction purposes, or perform other functions to enable further enable emotion prediction.

Next, features may be extracted from the pre-processed text, speech, or images at 612. Such a feature may be performed or executed by the multimodal feature extraction circuitry 214. multimodal feature extraction 612 may include extracting features from any type of input from the multimodal input. For example, feature extraction for captured speech may include extracting or separating each different acoustic feature from the captured pre-processed speech. Such acoustic features may include zero crossing rate, spectral centroid, spectral spread, spectral entropy, spectral flux, spectral roll-off, and/or Mel frequency Cepstral coefficients. Feature extraction for text may include determining whether particular words or phrases are utilized, frequency of use particular words or phrases, frequency of misspelled words, grammatical errors, and/or misused or misplaced punctuation. Feature extraction regarding keystrokes may include total amount of keystrokes and/or keystroke frequency (e.g., keystrokes per minute). Feature extraction for images or video may include separation of images (e.g., separation of images of faces or limbs). Each feature may be transmitted, as a vector or as part of a vector, to a multimodal feature BLSTM network 614. The multimodal feature BLSTM network 614 may output a multimodal hidden vector relating to the likelihood of an emotion for a particular multimodal feature. The multimodal hidden vector may be transmitted to an attention layer 616.

In addition, if the multimodal input includes speech, the speech may be transmitted for ASR and embedding at operation 606. Such a feature may be performed or executed by ASR circuitry 212 of the apparatus 200. The ASR and embedding operation 606 may include converting the speech to text. The text, either from ASR circuitry 212 or as directly captured from a text-based interaction, may be transmitted to a context BLTSM network, for example ELMo 608. The ELMo 608 may create or generate a context or ELMo hidden vector relating to the context of each word or subset of words in the text. The context or ELMo hidden vector may then be transmitted to a text BLSTM network 610. The text BLSTM network 610 may create or generate a text hidden vector relating to an emotion of text based on the context and word choice of the text, among other aspects. The text BLSTM network 610 may transmit the text hidden vector to the attention layer 616 and further to an additional BLSTM network 618.

As noted, the text hidden vector and multimodal hidden vector may be transmitted to an attention layer 616. The attention layer 616 is used to learn the alignment between the hidden vectors corresponding to multimodal and text features (e.g., from text BLSTM network 610 and multimodal feature BLSTM network 614). Each word aligned vector is created as the normalized weighted sum of the multimodal hidden vectors. These normalized weights act as attentions and are obtained as the weighted combination of the speech and text hidden vectors where the weights/parameters are learned during training. The word aligned speech hidden vectors and text hidden vectors are concatenated and are further processed using a BLSTM network to learn the representations that are optimal for emotion prediction.

The output of the attention layer 616 and the output of the text BLSTM network 610 may be transmitted, as illustrated in FIG. 6B, to the additional BLSTM network 618 to further refine the emotion prediction. The output vector of the additional BLSTM network 618 may then be transmitted to a max-pooling layer 620. The max-pooling layer 620 may be used to reduce the dimension of the hidden vectors obtained from the additional BLSTM network 618 which, in turn, avoids high complexity in the following fully connected network, the complexity depending on the input dimension. The max-pooling layer 620 uses a sliding kernel on the input vector and for each kernel placement, the maximum value is considered in the output vector. Likewise, the output vector is obtained by considering maximum values from the input vector. The output vector may be transmitted to a fully connected layer 622. In the fully connected layer 622, the inputs from one layer are connected to every node of the next layer. The network complexity (number of weights) depends on the input dimension and number of hidden layers. The last layer in the fully connected layer 622 outputs an M-dimensional vector where M is the number categories of emotions that are considered. The M-dimensional vector may be transmitted to a Softmax function 624. Determining an emotion may be treated as a multi-class classification problem. Thus, Softmax activation is used which is a generalization of logistic function to multiple dimensions. The Softmax function 624 takes the M-dimensional vector from the fully connected layer 622 and normalizes it into probability distribution consisting of M probabilities. Thus, the output of the Softmax function 624 consists of values between 0 and 1. The emotion class corresponding to the maximum probability score is considered as a final prediction from the model (e.g., see emotion prediction 626). Such a final prediction may be or may be used to generate an EmotionPrediction or update an existing EmotionPrediction (e.g., in an ongoing interaction later predictions may be utilized to update an already generated EmotionPrediction).

The final prediction may be utilized to determine a personalized or next best action at operation 628. Further, the predicted emotion may be utilized or compiled into training data 630. The training data 630 may be utilized, along with the text and audio, to refine and/or retrain any of the BLSTM networks as described herein. Further, the predicted emotion, as well as other data related to the customer interaction, may be stored and/or utilized to determine the performance of a particular branch or business location, the performance of an IVR, the performance of an AI bot, performance over a specified time period, or for other statistical purposes.

Such actions or functions, as described in relation to FIGS. 6A and 6B, may be performed, stored in, and/or executed by the circuitry of apparatus 200 and/or the emotion prediction system 102. For example, each BLSTM network in FIGS. 6A and 6B may be stored, as instructions, in memory 204 and/or emotion prediction circuitry 216 and may be utilized by emotion prediction circuitry 216.

Figure 7A:
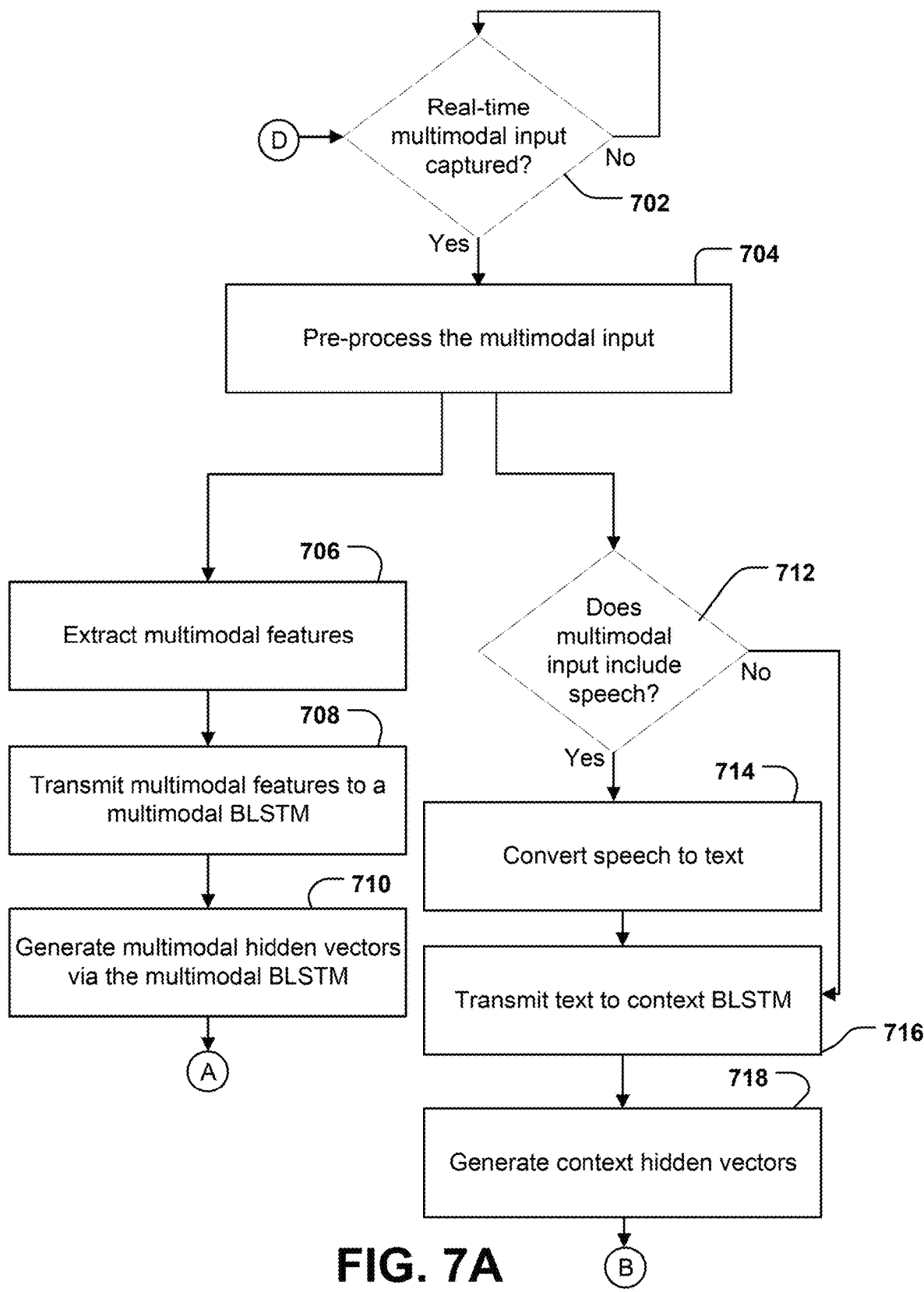
FIGS. 7A, 7B, and FIG. 7C illustrate example flowcharts for generating an emotion prediction and determining a next best action or call routing, in accordance with some example embodiments described herein.
Figure 7B:
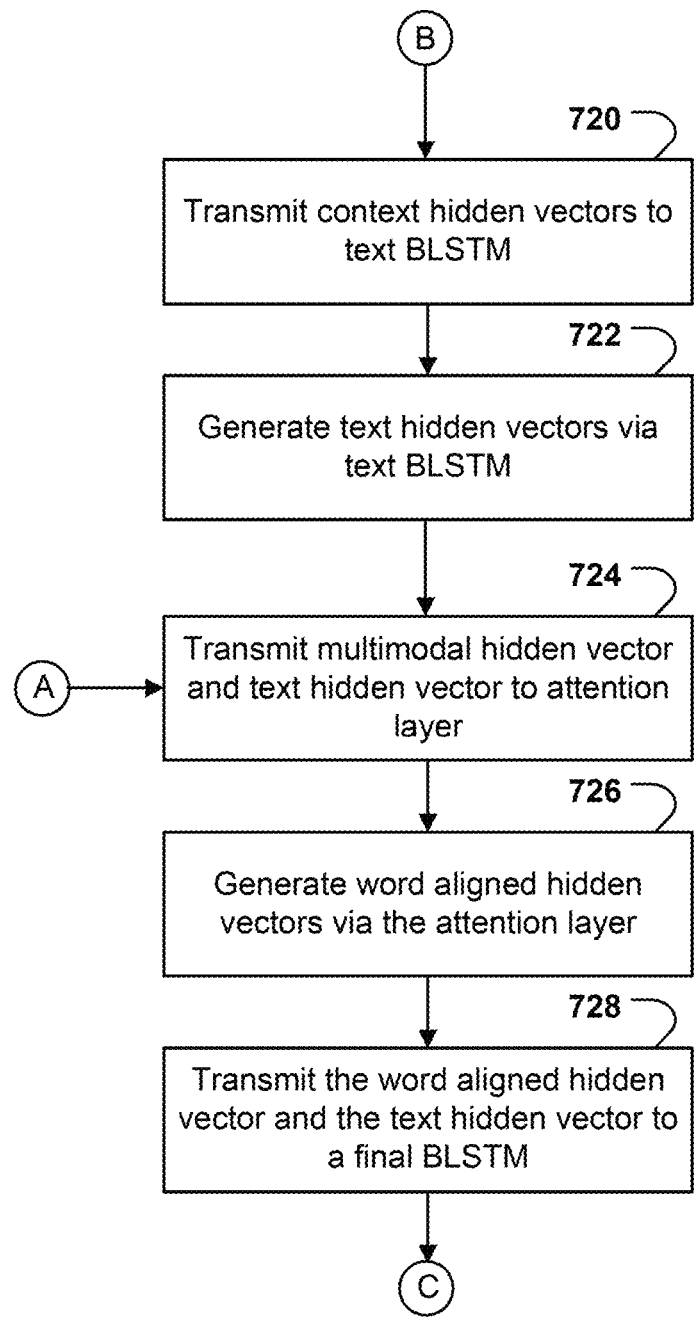
Figure 7C:
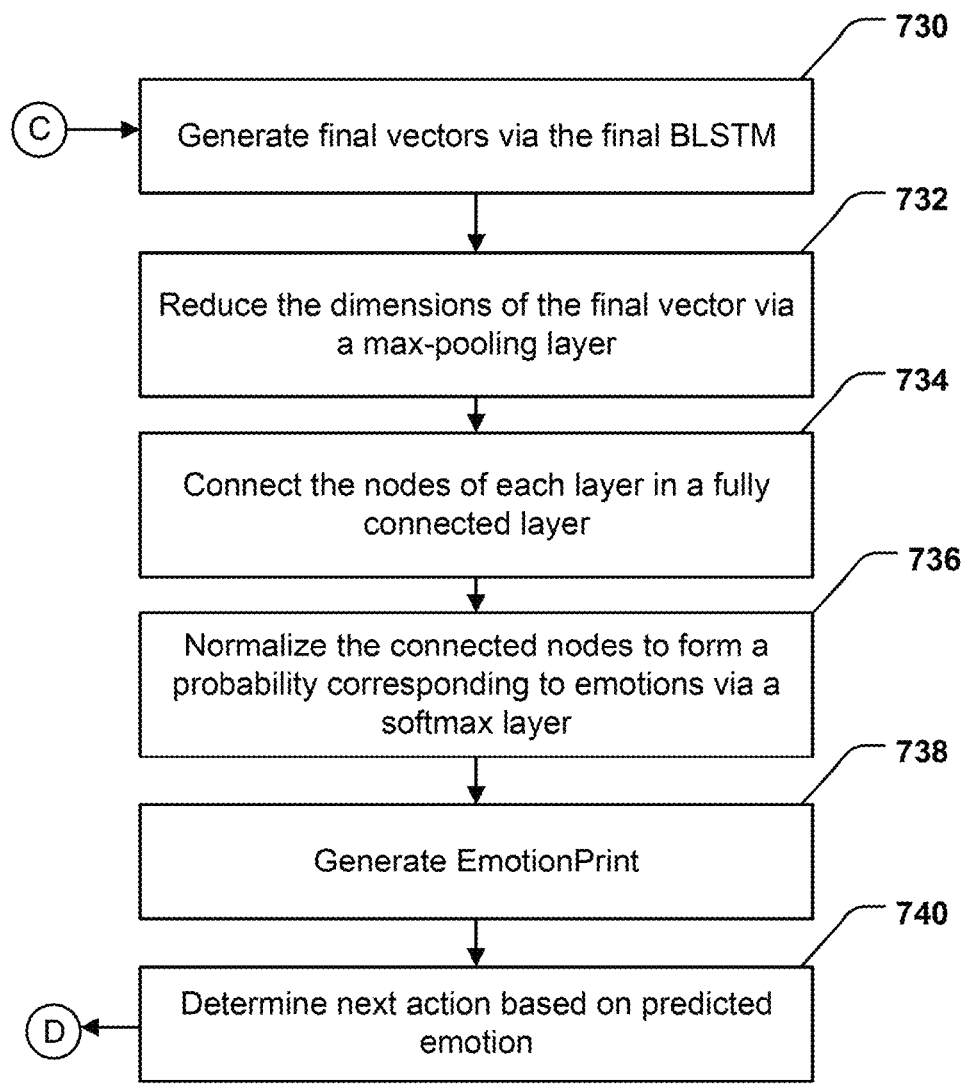

Turning to FIGS. 7A through 7C, example flowcharts are illustrated that contain example operations implemented by example embodiments described herein. The operations illustrated in FIGS. 7A through 7C may, for example, be performed by system device 104 of the emotion prediction system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, pre-processing circuitry 210, ASR circuitry 212, acoustic feature extraction circuitry 214, emotion prediction circuitry 216, call processing circuitry 218, and/or any combination thereof. It will be understood that user interaction with the emotion prediction system 102 may occur directly via input-output circuitry 208, or may instead be facilitated by a separate IVR 112A-112N, as shown in FIG. 1, and which may have similar or equivalent physical componentry facilitating such user interaction.

As shown by operation 702, the apparatus 200 includes means, such as processor 202, communications circuitry 206, input-output circuitry 208, pre-processing circuitry 210, or the like, for determining whether a real-time multimodal input has been captured. In an example, the multimodal input may include an initial communication or reply which has been given or is being given in response to a prompt or question. The multimodal input may include one or more of keystrokes, text, speech, or images. Such a feature may be performed in IVR circuitry or systems or AI bot circuitry or systems, such as any of the IVRs 112A-112N, any of the AI bots 116-116N, or other automated systems. The multimodal input may be stored or saved and, as described herein, to predict emotions. Further, the multimodal input may be from a customer and/or an agent. For example, as a customer interacts with a chat bot, emotions of the customer may be predicted. At a point later in the interaction, the customer may interact with an agent. At such a point in time, the multimodal input captured may be from the customer and/or agent.

As shown by operation 710, the apparatus 200 includes means, such as pre-processing circuitry 210 or the like, for pre-processing the multimodal input. The pre-processing circuitry 210 may reduce noise either in images or speech, determine an end point of speech, correct misspelled words in text while preserving the original text for emotion prediction purposes, or perform other functions to enable further enable emotion prediction. The pre-processing circuitry may perform such actions by amplifying high frequencies, via other denoising techniques, and/or executing spell check algorithms, as will be understood by those skilled in the art. Further, pre-processing circuitry 210 may determine when the speech begins and/or ends (e.g., a speech endpoint). In an embodiment, the speech beginning point and/or end point may be determined (e.g., detected) via the use of different frequencies (e.g., high and low frequencies) and time domains. For example, background noise, which may be at a specific frequency, may be removed. Other background voices may be removed as well. Finally, based on time and the absence of any other frequencies, the speech end point may be determined. In another embodiment, this pre-processing step may break the speech into separate sentences and each sentence may be analyzed as described in greater detail below. From operation 704, the procedure advances both to operation 706, for further processing of multimodal features of the multimodal input, and to operation 712 for further processing of text included in the multimodal input and/or text elements of the speech.

As shown by operation 706, the apparatus 200 includes means, such as multimodal feature extraction circuitry 214 or the like, for extracting multimodal features. The multimodal feature extraction circuitry 214 features may extract features from any type of input from the multimodal input. For example, feature extraction for captured speech may include extracting or separating each different acoustic feature from the captured pre-processed speech. Such acoustic features may include zero crossing rate, spectral centroid, spectral spread, spectral entropy, spectral flux, spectral roll-off, and/or Mel frequency Cepstral coefficients. Each acoustic feature may exhibit certain qualities useful in determining emotion. The acoustic features may include zero crossing rate, spectral centroid, spectral spread, spectral entropy, spectral flux, spectral roll-off, and/or Mel frequency Cepstral coefficients. Zero crossing rate may be the rate of sign changes of the signal during the given speech. The spectral centroid may be the weighted average frequency for a given sub band. The spectral spread may be a measure of average spread of the spectrum in relation to its centroid. The spectral entropy may be an entropy computed based on a probability mass function of normalized spectrum. The spectral flux may be the squared difference between the normalized magnitudes of the successive spectra. The spectral roll-off may be he frequency under which some percentage of the total energy of the spectrum is contained. The Mel frequency Cepstral coefficients may be the linear cosine transform of a log power spectrum on a nonlinear Mel scale of frequency.

Feature extraction for text may include determining whether particular words or phrases are utilized, frequency of use particular words or phrases, frequency of misspelled words, grammatical errors, and/or misused or misplaced punctuation. Each text feature may exhibit certain qualities useful in determining emotion. For example, as frequency of grammatical errors, misspelled words, misused or misplaced punctuation increases, such an increase may indicate heightened emotion, such as anger or excitement. In another example, the use of certain words or phrases may indicate certain emotions. Feature extraction regarding keystrokes may include total amount of keystrokes and/or keystroke frequency (e.g., keystrokes per minute). Different keystrokes per minute may indicate different emotions. For example, 150 keystrokes per minute indicate a normal emotional state. An increase to about 180 keystrokes per minute may indicate anger. Feature extraction for images or video may include separation of images (e.g., separation of images of faces or limbs). Facial expressions or hand or limb gestures may be utilized to determine emotion. Once one or more of the multimodal features are determined or separated, the one or more multimodal features may be transmitted for further analysis.

As shown by operation 708 and as noted, the apparatus 200 includes means, such as multimodal feature extraction circuitry 214 or the like, for transmitting the one or more multimodal features as a multimodal vector to a multimodal BLSTM network.

As shown by operation 710, the apparatus 200 includes means, such as emotion prediction circuitry 216 or the like, for generating multimodal hidden vectors via a multimodal BLSTM network. The emotion prediction circuitry 216 may include the multimodal BLSTM network. The multimodal BLSTM network may be trained using various prior customer conversations with known emotions. The multimodal hidden vectors may be a vector or matrix including the multimodal feature, associated multimodal input, and an indicator indicating an emotion. The indicator may be represented by a number, for example, a number between 0 and 1. The emotion prediction circuitry 216 may transmit or feed the multimodal hidden vectors into an attention layer, as described below in connection with operation 724.

As noted previously, operation 712 may be reached from operation 704 in order to further process input text or text that may be extracted from the speech. As shown by operation 712, the apparatus 200 includes means, such as pre-processing circuitry 210, ASR circuitry 212, or the like, for determining whether the multimodal input includes speech. If the multimodal input includes speech, then the method proceeds to operation 716, otherwise the method proceeds to operation 714.

As shown by operation 714, the apparatus 200 includes means, such as ASR circuitry 212 or the like, for converting the speech to text. The ASR circuitry 212 may convert a portion or all of a customer's and/or agent's response. In other words, when determining emotion of a customer, the ASR circuitry 212 may convert the customer's speech to text, while when determining emotion of an agent, the ASR circuitry 212 may convert the agent's speech to text. In another embodiment, the ASR circuitry 212 may convert the customer's and agent's speech to text.

As shown by operation 716, the apparatus 200 includes means, such as processor 202, memory 204, communications circuitry 206, emotion prediction circuitry 216, or the like, for transmitting the text, from the multimodal input and/or converted from speech, to a context BLSTM network or an ELMo.

As shown by operation 518, the apparatus 200 includes means, such as emotion prediction circuitry 216 or the like, for generating context hidden vectors or ELMo hidden vectors. The emotion prediction circuitry 216 may utilize the context BLSTM network or ELMo to generate a context or ELMo hidden vector for a series of words included in the text. The context BLSTM network or ELMo may be trained with a large text corpus. The context BLSTM network or ELMo may produce a vector distinguishing between different words used by a customer or agent.

As shown by operation 720, the apparatus 200 includes means, such as processor 202, memory 204, communications circuitry 206, emotion prediction circuitry 216, or the like, for the transmission of the context or ELMo hidden vector to a text BLSTM network.

As shown by operation 722, the apparatus 200 includes means, such as emotion prediction circuitry 216 or the like, for generating text hidden vectors via the text BLSTM network. The text BLSTM network may be trained using similar customer calls or text-based interactions with known or determined emotions. The text BLSTM network may include a larger training data set, as additional text with determined emotions is available. The emotion prediction circuitry 216 may utilize the text BLSTM network to generate a text hidden vector.

As shown by operation 724, the apparatus 200 includes means, such as processor 202, memory 204, communications circuitry 206, emotion prediction circuitry 216, or the like, for transmitting the multimodal hidden vector and text hidden vector to an attention layer.

As shown by operation 726, the apparatus 200 includes means, such as emotion prediction circuitry 216 or the like, for generating or determining, via an attention layer, alignment between hidden vectors, thereby forming a word aligned hidden vector. The emotion prediction circuitry 216 may utilize the word aligned hidden vector to predict emotion.

As shown by operation 728, the apparatus 200 includes means, such as processor 202, memory 204, communications circuitry 206, emotion prediction circuitry 216, or the like, for transmitting the word aligned hidden vector and the text hidden vector to a final BLSTM network.

As shown by operation 730, the apparatus 200 includes means, such as emotion prediction circuitry 216 or the like, for generating the final vectors via the final or additional BLSTM network. The emotion prediction circuitry 216 may utilize the final or additional BLSTM network to further refine the final vector prior to final processing and prediction.

As shown by operation 732, the apparatus 200 includes means, such as processor 202, memory 204, communications circuitry 206, emotion prediction circuitry 216, or the like, for reducing the dimensions of the final vector via a max-pooling layer which, in turn, avoids high complexity in the following fully connected network.

As shown by operation 734, the apparatus 200 includes means, such as emotion prediction circuitry 216, or the like, for connecting the nodes of each layer from the max-pooling layer via a fully connected layer to thereby produce an M-dimensional vector, where M is the number categories of emotions that are considered.

As shown by operation 736, the apparatus 200 includes means, such as emotion prediction circuitry 216, or the like, for normalizing the connected nodes to form a probability corresponding to emotions via a Softmax module or layer. The Softmax module or layer takes the M-dimensional vector from the fully connected layer and normalizes it into a probability distribution consisting of M probabilities. Thus, the output of the Softmax module or layer consists of values between 0 and 1

As shown by operation 738, the apparatus 200 includes means, such as emotion prediction circuitry 216, or the like, for predicting the customer's and/or agent's emotions and/or generating an EmotionPrint. The emotion prediction circuitry 216 may determine or predict the customer's and/or agent's emotion based on the output from the Softmax module or layer. For example, a series of the probabilities may be output from the Softmax module or layer for each of the M probabilities. The emotion prediction circuitry 216 may select the emotion with the highest probability as the predicted emotion. In another example, the emotion prediction circuitry 216 may predict emotion based on a combination of the probabilities output from the Softmax module or layer. Such a predicted emotion may be considered or utilized to generate or update an EmotionPrint. For example, an EmotionPrint may be an aggregation of emotions for an ongoing interaction (e.g., each emotion predicted for each of a plurality of portions of the interaction).

As shown by operation 740, the apparatus 200 includes means, such as emotion prediction circuitry 216, call processing circuitry 218, or the like, for determining the next action or best action based on the predicted emotion. The emotion prediction circuitry 216 or call processing circuitry 218 may determine the next action or best action based on the predicted emotion and other factors. Other factors may include, whether the customer is on a call with an IVR or a live agent, whether the customer is communicating via text-based communication with an AI bot or a live agent, a live agent's call or other interaction handling history, a live agent's rating, a live agent's experience, a live agent's availability, the context of the customer's call (as determined by the context BLSTM network or ELMo), how long a customer has been waiting, and/or a personalized product or service recommendation.

In another embodiment, the operations illustrated in FIGS. 7A through 7C may be an iterative or continuous process. As a customer calls in, the customer may give more than one response in reply to various prompts from an IVR, AI Bot, or agent. Further, a customer's emotion may change as a call or interaction progresses. As such, emotion may be predicted at each portion of the customer interaction. Further, the next best action may change after each portion of a conversation, based on the current or most recently predicted emotion, as well as previous predictions for the current call or interaction. Further still, emotions predicted at different times may be weighted differently based on the time of the prediction in relation to the call or interaction. The apparatus 200 includes means, such as the emotion prediction circuitry 216 or call processing circuitry 218, to determine which portion of a call or conversation an emotion is being predicted for, e.g., the beginning, the end, or a portion in between. The emotion prediction circuitry 216 or call processing circuitry 218 may weight the predicted emotion based on the time of the portion of the call or interaction. For example, an earlier prediction may be given a higher weight than a later prediction, when determining a next best action. In another example, the later predicted emotion may be given a higher weight than the earlier predicted emotion. Further, weight may be given to emotions based on changes from previous emotions (e.g., from happy to angry).

In another embodiment, one or more of EmotionPrints generated for a particular agent may be utilized to determine the performance of the agent. Further, one or more EmotionPrints generated for employees or agents at a particular location or region may be utilized to determine the performance of the particular location or region. In an example, the one or more EmotionPrints for an agent may be used to determine a score. The score may be indicative of the agent's performance. The score may be a number or other indicator (e.g., high, medium, low or good, bad, etc.) to indicate the performance of an agent. Such a score may be updated as additional EmotionPrints are generated. The score may further be utilized to determine next actions in future interactions.

Once the next action or best action has been determined, the call processing circuitry 218 may execute such an action. For example, if the next action is determined to be a re-route of a call from an IVR or of a text-based interaction from an AI bot to a live agent, then the call processing circuitry 218 may transfer the call or text-based interaction based on that determined next action.

As described above, example embodiments provide methods and apparatuses that enable improved emotion prediction and issue resolution. Example embodiments thus provide tools that overcome the problems faced by typical emotion prediction systems. By utilizing text and audio vectors, a more accurate emotion prediction may be made. Moreover, embodiments described herein avoid less accurate predictions. The use of multiple machine learning algorithms, in particular BLSTM networks, as well as many different types of inputs, provide for a more accurate prediction in real-time, ensuring a customer's issue is resolved quickly.

As these examples all illustrate, example embodiments contemplated herein provide technical solutions that solve real-world problems faced during customer calls or text-based interactions with customers exhibiting anger or otherwise unsatisfactory emotions. And while customer satisfaction has been an issue for decades, the introduction of IVRs and AI bots has introduced longer wait times and further frustrated customers, as navigation takes time and does not always result in proper communication routing and/or issue resolution. As the demand for faster resolution times and customer satisfaction significantly grows, a solution to resolve this issue does not exist. At the same time, the recently arising ubiquity of speech capture, among capture of other types of input, and machine learning has unlocked new avenues to solving this problem that historically were not available, and example embodiments described herein thus represent a technical solution to these real-world problems.

FIGS. 7A through 7C illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for predicting an emotion based on a multimodal input, the method comprising:
   receiving, by a communications circuitry, a multimodal input from a user including at least (i) an amount of keystrokes over a period of time, (ii) text, and (iii) speech;
   converting, via automatic speech recognition circuitry, the speech to converted text;
   causing, by a speech-context Bidirectional Long Short-Term Memory (BLSTM) of an emotion prediction circuitry and using the text and the converted text, generation of context hidden vectors;
   causing, by the emotion prediction circuitry, generation of audio hidden vectors using the speech and an audio BLSTM;
   generating, by a trained machine learning model of the emotion prediction circuitry and using the multimodal input, the context hidden vectors, and the audio hidden vectors, an EmotionPrint for the user; and
   determining, by the emotion prediction circuitry and using the EmotionPrint, a next action.

2. The method of claim 1, wherein the multimodal input includes a series of images.

3. The method of claim 1, wherein generating the EmotionPrint includes:
   causing, by a multimodal feature extraction circuitry and using the multimodal input, generation of one or more multimodal features;
   extracting, by the multimodal feature extraction circuitry and using the one or more multimodal features, one or more multimodal vectors;
   normalizing, via a Softmax layer of an emotion prediction circuitry, the one or more multimodal vectors to form one or more probabilities corresponding to one or more emotions; and
   calculating, via the Softmax layer of the emotion prediction circuitry, a probability distribution based on the one or more probabilities corresponding to one or more emotions and wherein the EmotionPrint is generated based on the probability distribution.

4. The method of claim 3, further comprising, prior to formation of the one or more probabilities corresponding to one or more emotions:
   causing, by the emotion prediction circuitry, generation of word aligned hidden vectors using the audio hidden vectors, the context hidden vectors, and an attention layer;
   causing, by the emotion prediction circuitry, generation of hidden vectors using the context hidden vectors, the one or more multimodal vectors, and a final BLSTM network;
   reducing, via a max-pooling layer, dimensionality of the hidden vectors to generate reduced dimensionality hidden vectors; and
   causing, by the emotion prediction circuitry, generation of an emotion vector using the reduced dimensionality hidden vectors and a fully connected layer,
   wherein the emotion vector is used to form the one or more probabilities corresponding to one or more emotions.

5. The method of claim 3, further comprising, prior to generation of one or more multimodal features, pre-processing, by the multimodal feature extraction circuitry, the multimodal input.

6. The method of claim 5, wherein pre-processing the multimodal input includes applying a corresponding pre-processing algorithm to a corresponding type of input included in the multimodal input.

7. The method of claim 6, wherein the corresponding pre-processing algorithms include one or more of audio pre-processing algorithms, image pre-processing algorithms, or text pre-processing algorithms.

8. The method of claim 3, wherein the multimodal input is defined by a portion of communication from a customer.

9. The method of claim 8, wherein the one or more emotions are determined for each portion of communication from a customer.

10. The method of claim 3, wherein the one or more multimodal features includes one or more of a number of keystrokes per minute, number of random keystrokes, misspelled words, grammatical errors, or use of punctuations and capitalization.

11. The method of claim 1, wherein the next action includes providing one or more of personalized product recommendations and personalized service recommendations.

12. The method of claim 1, wherein the next action includes one or more of transitioning chat based communication to a call, transferring a communication to a live agent, providing a resolution to an issue.

13. An apparatus for predicting an emotion based a multimodal input, the apparatus comprising:
   a communications circuitry configured to receive a multimodal input from a user including at least (i) an amount of keystrokes over a period of time, (ii) text, and (iii) speech;
   an automatic speech recognition circuitry configured to convert the speech to converted text; and
   an emotion prediction circuitry configured to:
      cause, by a speech-context Bidirectional Long Short-Term Memory (BLSTM) and using the text and the converted text, generation of context hidden vectors, cause generation of audio hidden vectors using the speech and an audio BLSTM, generate, by a trained machine learning model using the multimodal input, the context hidden vectors, and the audio hidden vectors, an EmotionPrint for the user, and determine a next action based on the EmotionPrint.

14. The apparatus of claim 13, the multimodal input includes text from a communication between an artificial intelligence (AI) chat bot and a customer.

15. The apparatus of claim 14, wherein the next action may include transferring the communication to a call center, and wherein further multimodal inputs include audio based on speech from the customer to an agent or interactive IVR.

16. The apparatus of claim 15, wherein the apparatus further comprises:
   a call processing circuitry configured to:
      execute the next action; and
      in response to the next action being a transfer to call center, transfer the EmotionPrint and customer data to a corresponding agent.

17. The apparatus of claim 13, further comprising:
   a multimodal feature extraction circuitry configured to:
      cause, using the multimodal input, generation of one or more multimodal features, and
      extract, using the one or more multimodal features, one or more multimodal vectors; and
   an emotion prediction circuitry configured to:
      normalize, via a Softmax layer, the one or more multimodal vectors to form one or more probabilities corresponding to one or more emotions, and
      calculate, via the Softmax layer, a probability distribution based on the one or more probabilities corresponding to one or more emotions, wherein the EmotionPrint is generated using the one or more probabilities.

18. The apparatus of claim 17, wherein the emotion prediction circuitry is further configured to:
   cause generation of word aligned hidden vectors using the audio hidden vectors, the context hidden vectors, and an attention layer;
   cause generation of hidden vectors using the context hidden vectors, the one or more multimodal vectors, and a final BLSTM network;
   reduce, via a max-pooling layer, dimensionality of the hidden vectors to generate reduced dimensionality hidden vectors; and
   cause generation of an emotion vector using the reduced dimensionality hidden vectors and a fully connected layer,
   wherein the emotion vector is used to form the one or more probabilities corresponding to one or more emotions.

19. A computer program product for predicting a customer's emotions, the computer program product comprising at least one non-transitory computer-readable storage medium storing software instructions that, when executed, cause an apparatus to:
   receive a multimodal input from a user including at least (i) an amount of keystrokes over a period of time, (ii) text, and (iii) speech;
   convert the speech to converted text;
   cause, by a speech-context Bidirectional Long Short-Term Memory (BLSTM) and using the text and the converted text, generation of context hidden vectors;
   cause generation of audio hidden vectors using the speech and an audio BLSTM;
   generate, by a trained machine learning model using the multimodal input, the context hidden vectors, and the audio hidden vectors, an EmotionPrint of the user; and
   determine a next action based on the EmotionPrint.

20. The computer program product of claim 19, wherein generation of the EmotionPrint is based on an average amount of keystrokes per minute, latency of keystrokes, key hold time, average speed of keystrokes, amount of deletes, amount of special characters used, or variability.

21. The computer program product of claim 20, wherein generation of the EmotionPrint is further based on text features, and wherein the text features include one or more of a term frequency-inverse document frequency, embedding, profanity, or praise.

22. The computer program product of claim 19, wherein the user is an agent, wherein the agent provides a plurality of multimodal inputs, and wherein an EmotionPrint is determined for each of the plurality of multimodal inputs.

23. The computer program product of claim 22, wherein each EmotionPrint for each of the plurality of multimodal inputs for the agent are aggregated to define an agent's score.

* * * * *